No. 751,833. PATENTED FEB. 9, 1904.
G. P. CLARK.
JOURNAL BEARING FOR TRUCK WHEELS AND CASTERS.
APPLICATION FILED MAY 12, 1903.
NO MODEL.
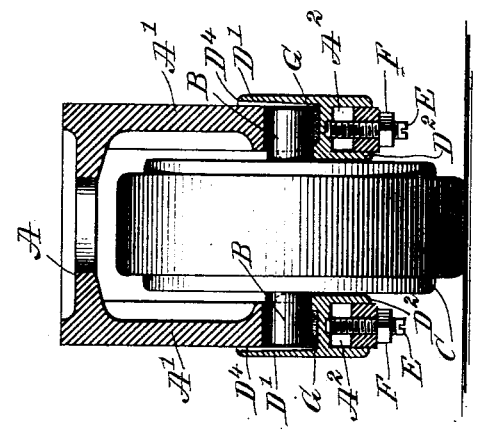
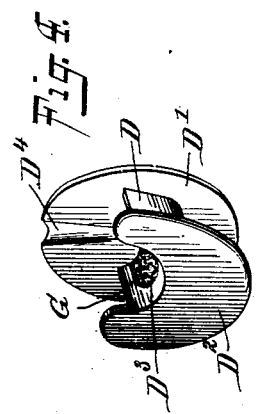
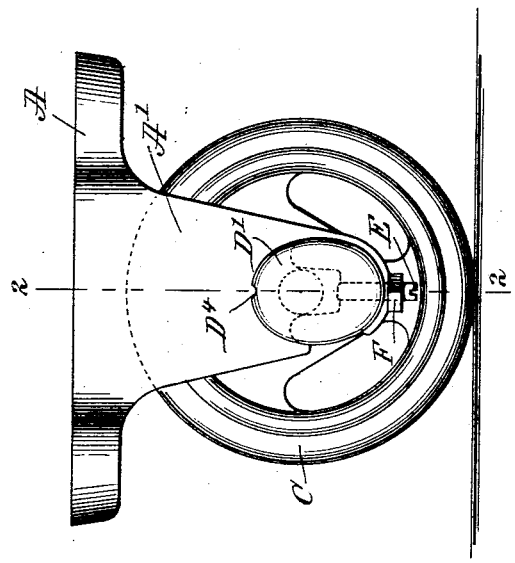
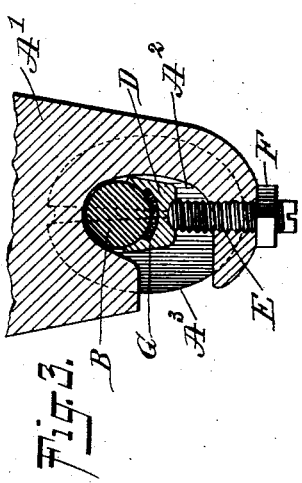
WITNESSES:
William P. Goebel
Geo. G. Hostetter
INVENTOR
George P. Clark
BY Munn & Co.
ATTORNEYS.

No. 751,833. Patented February 9, 1904.

UNITED STATES PATENT OFFICE.

GEORGE PAYSON CLARK, OF WINDSOR LOCKS, CONNECTICUT.

JOURNAL-BEARING FOR TRUCK WHEELS AND CASTERS.

SPECIFICATION forming part of Letters Patent No. 751,833, dated February 9, 1904.

Application filed May 12, 1903. Serial No. 156,763. (No model.)

*To all whom it may concern:*

Be it known that I, GEORGE PAYSON CLARK, a citizen of the United States, and a resident of Windsor Locks, in the county of Hartford and State of Connecticut, have invented a new and Improved Journal-Bearing for Truck Wheels and Casters, of which the following is a full, clear, and exact description.

The object of the invention is to provide a new and improved journal-bearing for truck wheels and casters for hand and platform trucks used in stores, banks, offices, and the like and arranged to prevent the axle from running dry in its bearings and to allow of conveniently and readily taking up the wear of the parts to prevent rattling, thus rendering the device noiseless.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a transverse section of the same on the line 2 2 of Fig. 1. Fig. 3 is an enlarged sectional side elevation of the improvement, and Fig. 4 is a perspective view of one of the journal-bearing blocks.

The hanger or bracket for the journal-bearing shown in the drawings consists of a plate A and depending standards A', formed near their lower ends with vertically-elongated journal-bearings $A^2$ for the ends of the axle B of a wheel C to run in, and in the side of each standard A' is formed a slot $A^3$, leading to the bottom portion of the corresponding bearing $A^2$. As shown, approximately the upper half portion of each axle end is in contact with the upper portion of the wall of the bearing $A^2$, while the lower portion of the axle end is supported in engagement with said bearing by the concaved top of a block D, extending transversely in the lower portion of the bearing $A^2$.

Each block D is held up in contact with the axle ends by a screw E, screwing in the lower part of the standard A' and abutting against the under side of the block, and by adjusting the screw E upward the block D is moved sufficiently firmly in contact with the axle end to allow the latter to turn freely or to prevent it from rattling. When the screw E is adjusted, it is locked against unscrewing by a jam-nut F.

The block D is provided at its outer and inner ends with flanges D' and $D^2$, fitting the inner and outer faces of the corresponding standards A', to prevent lateral movement of the blocks on the standards. In the top of each block is formed a recess $D^3$, which extends from the inner face of the outer flange D' transversely to within a short distance of the inner flange $D^2$, (see Figs. 2 and 4,) and this recess $D^3$ is preferably filled with an absorbent material G, such as waste, saturated with oil or other lubricant. The lubricant can be readily replenished from time to time without removal of the block from the standard by pouring the lubricant into a feed-groove $D^4$, formed on the inner face of the outer flange D' and extending downward from the top of the flange to the recess $D^3$. (See Fig. 2.)

In assembling the several parts the axle ends are passed sidewise through the slots $A^3$ to pass into the bearings $A^2$, so that the wheel C extends between the standards A', as plainly shown in the drawings. The blocks D are now passed through the said slots $A^3$ into the bearings $A^2$ to engage the under sides of the axle ends, and the screws E are now screwed up to hold the blocks in position against the journals or axle ends of the bearing.

From the foregoing it will be seen that the axle is prevented from rattling in the bearing and all wear on the axle ends, bearings, and blocks can be readily taken up by adjusting the screws E, and in case a block is completely worn out or is broken it can be readily removed and replaced by a new one.

Although I have shown the bracket or hanger arranged for adjustment to a truck-frame, it may be swiveled to form a caster.

Having thus described my invention, I claim as new and desire to secure by Letters Patent—

1. A journal-bearing comprising depending standards, having bearings for the axle to run in, said standards having slots in their sides leading into the bearings, and lubricating-blocks vertically slidable in the said bearings and engaging the axle at the under side, and having flanges fitting the faces of the standards, as set forth.

2. A journal-bearing comprising depending standards having bearings for the axle to run in, said standards having slots in their sides, leading to the lower portions of the bearings, and lubricating-blocks vertically slidable in the said bearings and engaging the axle at the under side, and having flanges fitting the faces of the standards, each block having a recess filled with a lubricating matter, in contact with the axle, as set forth.

3. A journal-bearing comprising depending standards having bearings for the axle to run in, said standards having slots in their sides, leading to the lower portions of the bearings, lubricating-blocks vertically slidable in the said bearings and engaging the axle at the under side, and having flanges fitting the faces of the standards, and means for adjusting the said blocks vertically and holding the same in engagement with the axle, as set forth.

4. In a journal-bearing, an axle-supporting block having a lubricating-recess in the face on which the axle bears, flanges on the ends of the block for holding the block against transverse movement on the bearing, and a feeding-groove on one of the flanges leading to the said recess, as set forth.

5. A journal-bearing comprising depending standards having bearings for the axle to run in, and having slots in the sides of the standards, leading to the lower portions of the bearings, lubricating-blocks vertically slidable in the said bearings and engaging the axle at the under side, and having flanges fitting the faces of the standards, each block having a recess filled with a lubricating matter, in contact with the axle, and one of said flanges having a groove on its inner face, leading to the said recess, as set forth.

6. A journal-bearing provided with a block having a lubricating-recess in the face on which the axle bears, and flanges on the ends of the block, for holding the block against transverse movement on the bearing, the inner flange being forked in its upper portion, as set forth.

7. A journal-bearing provided with a block having a lubricating-recess in the face on which the axle bears, and flanges on the ends of the block, for holding the block against transverse movement on the bearing, the inner flange being forked in its upper portion, and the outer flange having a feed-groove at its inner face, extending from the top downward to the said recess, as set forth.

In testimony whereof I have signed my name to this specification in the presence of two subscribing witnesses.

GEORGE PAYSON CLARK.

Witnesses:
   W. E. JOHNSON,
   GEORGE E. CLARK.